United States Patent [19]

Batzill

[11] Patent Number: 4,942,761

[45] Date of Patent: Jul. 24, 1990

[54] SENSING ARRANGEMENT FOR MEASURING THE ROTATIONAL SPEED OF A ROTATABLE SHAFT HAVING A CRANK

[75] Inventor: Manfred Batzill, Neuhausen, Fed. Rep. of Germany

[73] Assignee: Dr. Ing. h.c.F. Porsche AG, Fed. Rep. of Germany

[21] Appl. No.: 350,347

[22] Filed: May 11, 1989

[30] Foreign Application Priority Data

May 11, 1988 [DE] Fed. Rep. of Germany ....... 3816114

[51] Int. Cl.⁵ ............................................. G01M 15/00
[52] U.S. Cl. .................................................. 73/119 R
[58] Field of Search ............. 73/119 R, 116; 324/173, 324/174, 179

[56] References Cited

U.S. PATENT DOCUMENTS 3,581,561 6/1971 Tomashek et al. ............. 324/173 X

Primary Examiner—Jerry W. Myracle
Attorney, Agent, or Firm—Evenson, Wands, Edwards, Lenahan & McKeown

[57] ABSTRACT

An L-shaped scanning ring, which is constructed as a simple stamped metal part, can be mounted at a crankshaft web of a crankshaft after installation of the crankshaft. The scanning ring rests against the crankshaft web with both legs and, on one of the legs, carries a toothing which inductively cooperates with a stationary sensor mounted in the crankcase. The ring has a radially extending gap and, as a result, can be bent open so far that it can easily be fitted over the crankshaft. As a result of the subsequent bending-together, the scanning ring rests form-fittingly against the crankshaft web and is protected from twisting by means of pins.

9 Claims, 1 Drawing Sheet

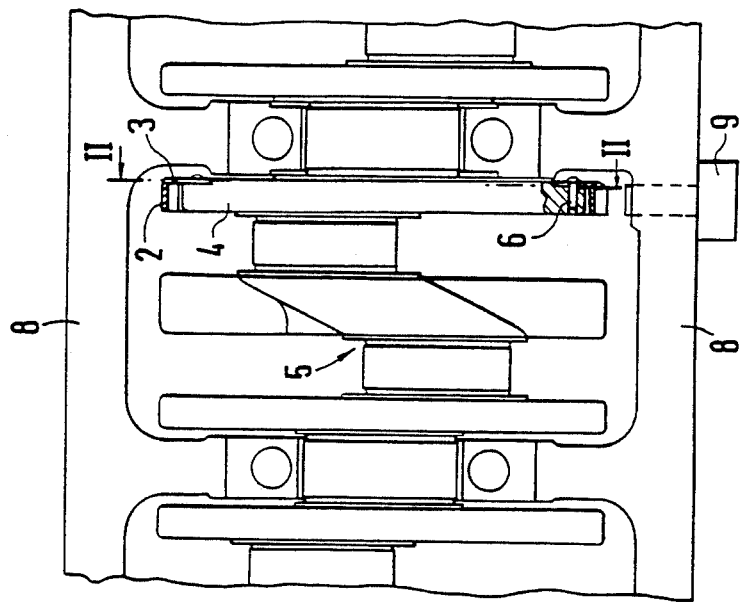
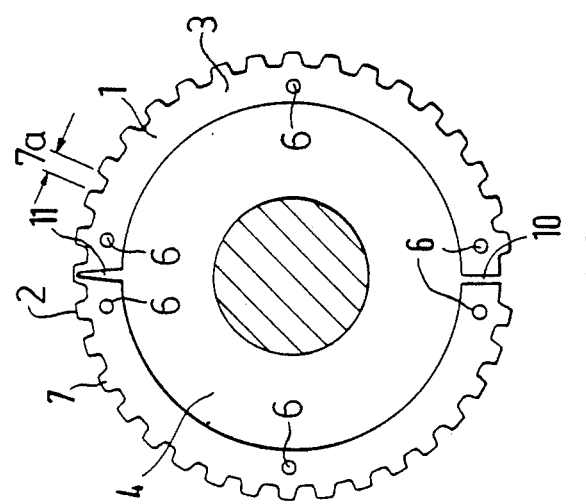

SENSING ARRANGEMENT FOR MEASURING THE ROTATIONAL SPEED OF A ROTATABLE SHAFT HAVING A CRANK

BACKGROUND AND SUMMARY OF THE INVENTION

The present invention generally relates to a sensing arrangement for measuring the rotational speed of a rotatable shaft and more particularly to such an arrangement for a shaft having at least one crank.

From German Published Unexamined Patent Application No. (DE-OS) 24 24 991, an arrangement is shown which senses the crankshaft rotational speed of an internal-combustion engine by means of a scanning disk which rotates adjacent a stationary sensor. In this case, a scanning disk is fitted outside of the crankcase onto the crankshaft which extends out of the engine toward the front.

In the above-noted arrangement, it is only possible to determine the crankshaft rotational speed by fitting the disk onto the front or rear end of the crankshaft. Because of the crankshaft throw, it is not possible to mount the disk at any arbitrary point of the crankshaft.

Thus, it is an object of the present invention to provide a sensing arrangement for measuring crankshaft rotational speed at any arbitrary point of a crankshaft.

It is a further object of the present invention to provide such a sensing arrangement which can be easily mounted and removed from the crankshaft, even after installation in an engine or the like.

It is a still further object of the present invention to provide a sensing arrangement for measuring the rotational speed of an internal combustion engine.

According to certain advantageous embodiments of the present invention, these and other objects are achieved by utilizing a scanning ring which form fittingly engages a crankshaft web after being radially bent open over a cylindrical part of a crankshaft.

In order to facilitate mounting of this type of a scanning ring easily at any arbitrary point, in one embodiment of the present invention, the scanning ring is provided with two legs which form an L-shaped cross-section and teeth at one of the legs, a recess being provided at a point approximately opposite a radially extending gap for permitting a bending opening of the ring during installation on a shaft.

Advantages achieved by preferred embodiments of the present invention include, in particular, that the scanning ring can be fastened at an arbitrary web of the crankshaft even after the crankshaft has been mounted into the crankcase, and that this mounting operation may take place in a simple manner without any expensive technical devices. In addition, the scanning ring can be manufactured at low cost as a stamped metal part.

Other objects, advantages and novel features of the present invention will become apparent from the following detailed description of the invention when considered in conjunction with the accompanying drawings.

BRIEF DESCRIPTION OF THE DRAWINGS

FIG. 1 is a rotational-speed scanning arrangement at the crankshaft of an internal-combustion engine constructed according to a preferred embodiment of the present invention.

FIG. 2 is a sectional view taken along Line II—II of FIG. 1.

DETAILED DESCRIPTION OF THE DRAWINGS

An embodiment of the invention is explained in detail in the following description, with particular reference to the drawings.

In the Figures, a scanning ring 1 is shown which has legs 2, 3 that form an L-shaped cross-section and rest against a circular cylindrical web 4 of the crankshaft in a form-fitting manner. The ring 1 is fastened at the crankshaft web 4 in a torsion-proof manner by pins 6 and has teeth 7 provided on the leg 2 with a given tooth spacing 7a. The ring inductively cooperates with a sensor 9 mounted in the crankcase 8 to provide an indication of the rotational speed of the crankshaft 5.

For the mounting operation, the scanning ring 1 is radially bent open so far that the width of the gap 10 corresponds at least to the diameter of the crankshaft 5. In this case, the recess 11 significantly facilitates the bending-open of the scanning ring 1 since only the substance of the leg 2 must be bent. In the bent-open state, the scanning ring 1 can easily be pushed over the crankshaft web 4 or a cylindrical portion of the shaft, and subsequently, by being-pressed together, can be connected form-fittingly with the crankshaft web 4 in such a manner that leg 3 rests laterally on the crankshaft web 4 and leg 2 rests on the front face of the crankshaft web 4.

Multiple mounting and dismounting is easily possible when the scanning ring 1 is made as a stamped part of elastic sheet-metal.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A scanning arrangement comprising:
   a rotational-speed sensor; and
   a toothed scanning ring for supplying rotational-speed signals to a shaft, particularly at the crankshaft of an internal-combustion engine, the teeth of the scanning ring affecting the rotational-speed sensor, wherein the scanning ring has a radial through-gap means for permitting a radially bent opening of the ring to extend over a cylindrical part of the crankshaft, and connecting means for form-fittingly connecting the ring with the part after mounting.

2. A scanning arrangement according to claim 1, wherein the cylindrical part of the crankshaft is a crankshaft web and wherein the scanning ring has an L-shaped cross-section formed by first and second legs which rest against the crankshaft web of the crankshaft when the scanning ring is connected to the crankshaft.

3. A scanning arrangement according to claim 2, wherein the scanning ring has vertically protruding teeth on one of the first and second legs.

4. A scanning arrangement according to claim 3, wherein the scanning ring is constructed as an elastic sheet-metal part.

5. A scanning arrangement according to claim 4, wherein the scanning ring has a recess which extends from an interior edge approximately to an exterior edge of the ring.

6. A scanning arrangement according to claim 5, wherein the recess is located approximately radially opposite the gap means.

7. A scanning arrangement according to claim 5, wherein the scanning ring is form-fittingly fastened at the crankshaft web of the crankshaft by the connecting means which include at least two pins which are mounted in direct proximity on both sides of the gap means.

8. A scanning arrangement according to claim 3, wherein the scanning ring is form-fittingly fastened at the crankshaft web of the crankshaft by the connecting means.

9. A scanning arrangement according to claim 8, wherein the connecting means comprise at least one pin.

* * * * *